July 7, 1931.  B. GOLDMAN  1,813,700
HYDRAULIC JACK
Filed Sept. 14, 1928   2 Sheets-Sheet 1
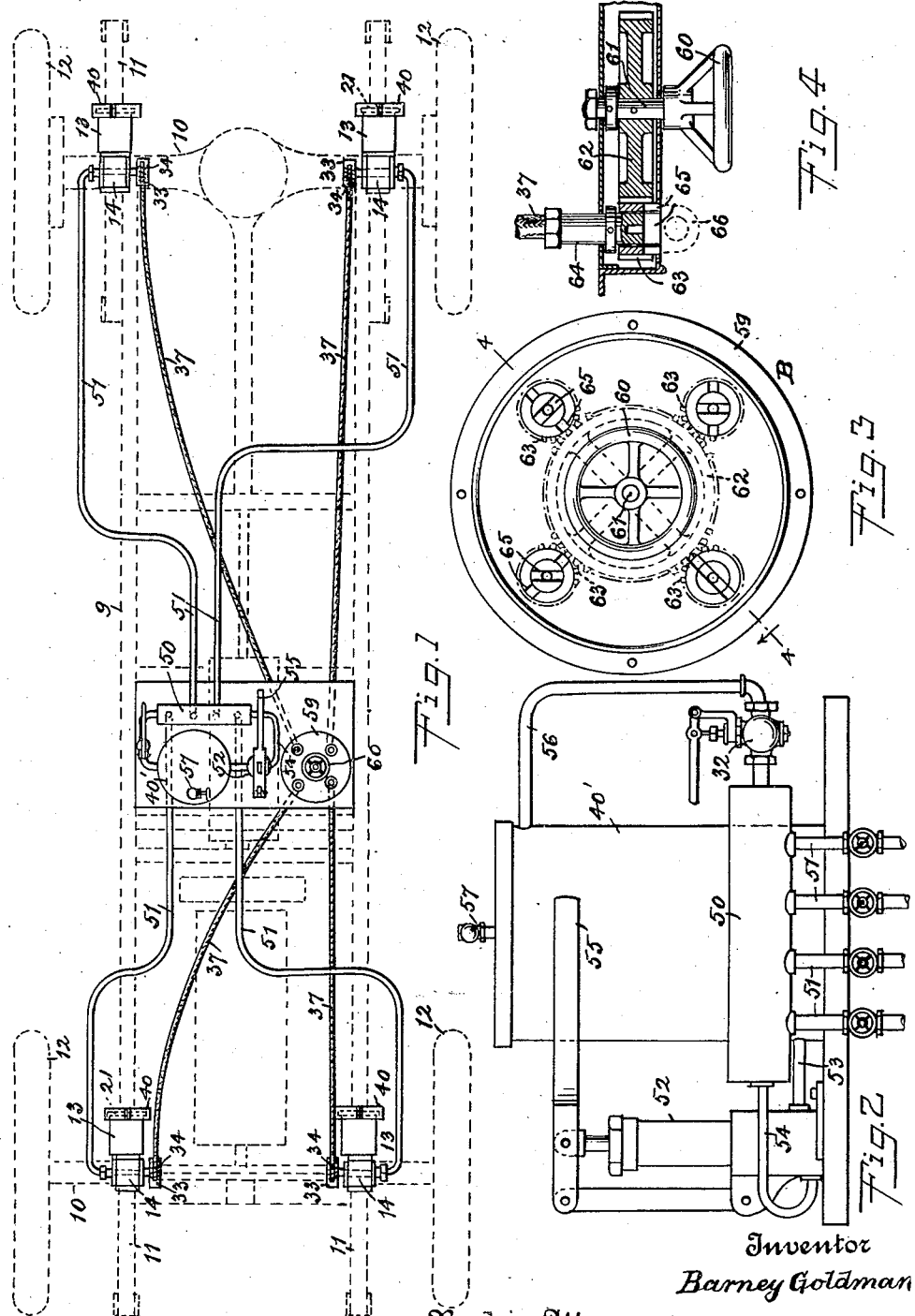
Inventor
Barney Goldman
By his Attorney
Joshua Bergstrom July 7, 1931.  B. GOLDMAN  1,813,700
HYDRAULIC JACK
Filed Sept. 14, 1928   2 Sheets-Sheet 2

Inventor
Barney Goldman
By his Attorney
Joshua Bergstrom

Patented July 7, 1931

1,813,700

UNITED STATES PATENT OFFICE

BARNEY GOLDMAN, OF NEW YORK, N. Y.

HYDRAULIC JACK

Application filed September 14, 1928. Serial No. 305,885.

This invention relates to new and useful improvements in hydraulic lifting jacks and resides in the provision of a plurality of jacks that are to be permanently secured to the axles of an automobile or similar vehicles, and comprehends devices controlled by the operator of the car, whereby any selected jack may easily be moved into position to elevate the car.

An object of the invention is to provide a suitable hand-operated hydraulic pump, within the reach of the operator of the car, for the purpose of forcing a liquid, stored in a tank, into any one of the hydraulic jacks, for the purpose of lifting the whole or part of the car.

Another object of the invention is to provide a device for the selection of any one of the jacks, to elevate a certain wheel, where repairs may be needed, also a driving gear mechanism whereby the selected jack may be moved into an operative position, within the reach of the operator, while seated behind the steering wheel of the car.

Another object of the invention is to provide a suitable locking and cushioning device for the jacks, while they are in inoperative position or while the car is travelling on the road.

And still another object of the invention is to provide means, whereby the telescopic jacks may be contracted into a small compass, while out of action, and higher lifting facility when expanded.

With the above and other objects in view, the invention consists in the details of construction and arrangement of parts to be hereinafter more fully described and claimed and illustrated in the accompanying drawings in which similar numerals of reference designate corresponding parts throughout the several views in which:—

Fig. 1 represents a plan view of an automobile in dotted lines, with the invention diagrammatically shown in full lines.

Fig. 2 represents the handpump, storage tank and manifold.

Fig. 3 is a front elevation of the jack-selecting mechanism.

Fig. 4 is a section on line 4—4 of Fig. 3.

Figure 5:
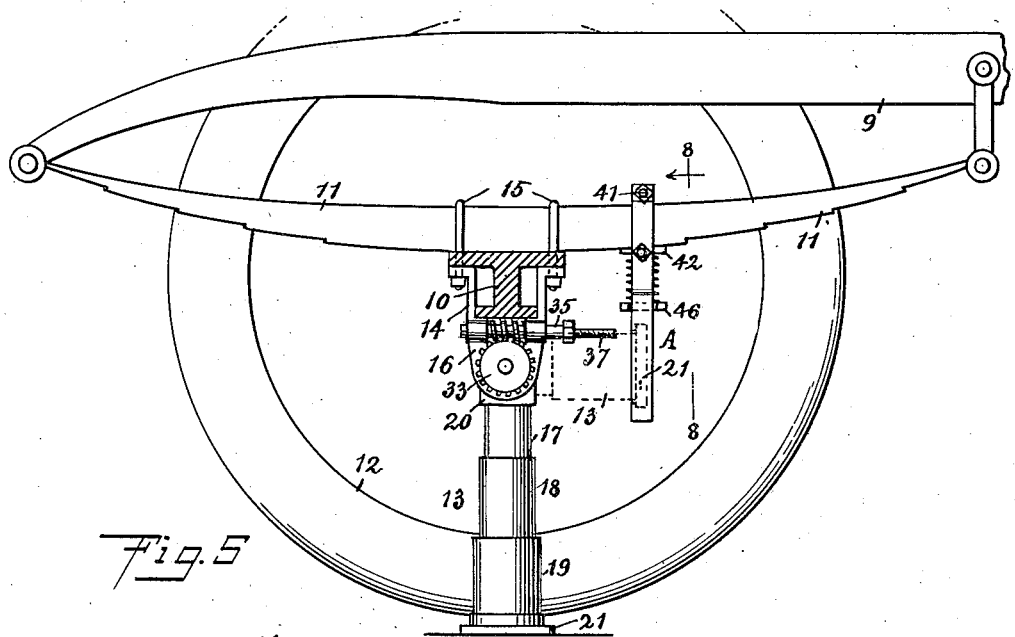
Fig. 5 is a side elevation of a portion of the chassis, showing in full lines the jack in an operating, and in dotted lines in an inoperative position.

In the drawings the numeral 9 designates the chassis of an automobile, having front and rear axles 10 provided with wheels 12. The hydraulic jack 13 is swingingly mounted under the axle 10 to a head 14 which is bifurcated and straddles the axle and is fastened with U bolts 15 to the spring 11 and axle 10.

The head 14 has two downwardly extending lugs 16 into which the jack is swingingly mounted.

Figures 6, 7, 8:
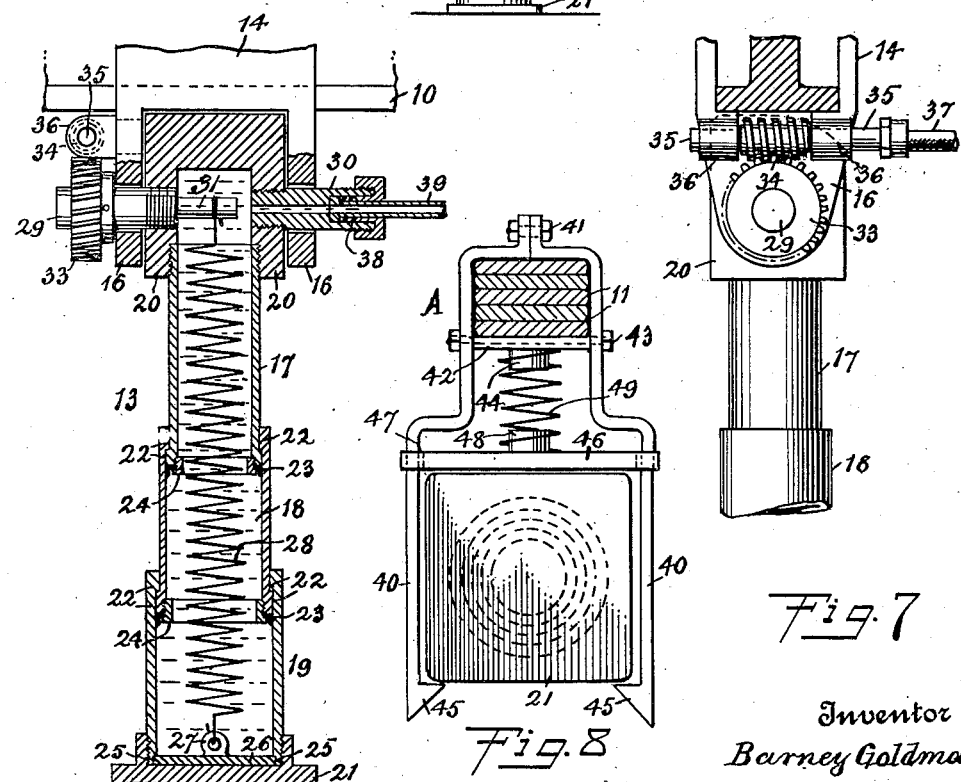
Fig. 6 is a cross-sectional elevation of the jack extended.
Fig. 7 is a fragmentary side elevation of the upper portion of the jack.
Fig. 8 is a cross-section on line 8—8 of Fig. 5.

Referring to Fig. 6, it will be seen that the jack is composed of three short sections of tubing 17, 18 and 19, telescoping each other. The upper section 17 is screwed into a head 20 and the lower section 19 into a base plate 21. Each section has an annular recess or shoulder 22 formed in the ends thereof to prevent the sections to pull apart when expanded.

Sections 17 and 18 have at their lower end an hydraulic packing 23, held in position by a hollow nut 24 screwed into the tubular members. The lower section 19 has a small recess 25 into which a plate 26 is fitted having in its centre an eye bolt 27, for the reception of spring 28.

Into the head 20 are threaded trunnions 29 and 30 onto which the jack swings. The trunnion 29 is made solid and having an inwardly extending teat 31 onto which the upper end of spring 28 is fastened. The object of this spring is to contract the jack, after it has been expanded and to force the oil out of the jack into the storage tank 40' after the return valve 32 has been opened.

A worm gear 33 is fastened to the trunnion 29 and is actuated by a worm 34 mounted on shaft 35 and mounted to revolve in bearings 36 fastened to one side of the pendant 16 of the head 14. To said shaft is fastened the flexible shaft 37, which connects to one of the pinions of the selecting device B.

The trunnion 30 is made hollow and has at its outer end a stuffing box 38 which connects with a pipe or tube 39, to one of the outlet pipes from the manifold.

By referring to Fig. 5, it will be seen that the jack has lifted the automobile clear off the ground and when the valve 32 is opened, the weight of the car will force the oil out of the jack into the storage tank 40' until the wheel 12 touches the ground. Then the spring 28 will force the remainder of the oil out until the jack is completely telescoped when it may be swung up into a horizontal position into the locking device A. The operation thereof will be explained later.

The locking device consists of springs 40 fastened on top of spring 11, a short distance from its centre, by a bolt 41. At the bottom of the spring is a follower plate 42 which is fastened to the springs 40 by a bolt 43. The lower side of the plate 42 has a a small teat 44. The springs 40 are bent outwardly so as to receive the base plate 21 and terminate at their lower ends with hooks 45. A follower plate 46 is made to slide on spring members 40 through a slot 47 in the ends thereof and having at its upper side a teat 48. A spring 49, interposed between the followers 42—46 is attached to the teats 44—48.

As the base plate 21 of the folded jack is forced up between the springs 40, the hooks 45 will press the springs outward until the base plate comes in contact under pressure with the follower 46 and then snap back under the base plate, where same will be held secure and kept from rattling, by the tension of spring 49, thereby relieving the weight of the jack on the gear 33 and worm 34.

The selecting device for expanding the jack is shown in Fig. 2 and comprises a liquid storage tank 40' and a manifold 50 having four valve controlled pipes 51 which connect with each jack. The pump 52 is connected to the tank 40' by a suction pipe 53 and a discharge pipe 54 leading in to the manifold 50. The pump is manually operated by a lever 55. At the opposite end of the manifold is a return valve 32 which connects with the tank by a pipe 56 and delivers the oil at the top of the tank. A small automatic air vent is shown at 57.

The selecting device for moving the jacks in and out of operative position comprises a small box 59 having in its center a handwheel 60, fastened to a shaft 61 mounted to revolve in bearings in the box. To this shaft is fastened a gear wheel 62 which meshes with four small pinions 63, spaced on a quarter circle and mounted to revolve on a shaft 64 which at the back of the box is connected to a flexible shaft 37 which in turn connects to each jack. The end of the pinion 63 has a small slot 65 and the end of the shaft 64 is also slotted.

It will be seen that if the handwheel is turned slightly, these slots will register with each other. When a certain jack is to be selected these two slots are made to register with each other and a small key 66 or a coin may be inserted which connects the two parts. It will now be seen that if the handwheel 60 is turned, it will also turn the flexible shaft 39 which is fastened to worm 36 on top of the jack 13.

The operation of the device is as follows. By referring to Fig. 1, it will be seen that the selecting device for swinging the jacks in position as well as the lifting device are shown diagrammatically.

Assuming that the jacks are held in a horizontal or locked position, the particular jack wanted is first selected, then by opening the corresponding valve in one of the pipes 51 leading from the manifold to the selected jack and a few strokes of the pumphandle will have a tendency to expand the jack, thereby forcing the base plate of the jack out of engagement with the locking device. The jack is now free to be moved downward and into position under the axle, by the flexible shaft 37 which connects with the worm 34 and worm gear 33. By inserting the key 66 into its respective slots in the selecting device B, the jack may now be lowered by turning the handwheel 60. After the jack is in a perpendicular position it may then be expanded, by the action of the pump, until the car is raised clear off the ground, which will allow the wheel to be taken off and repairs made. When it is desired to let the car down on the ground, it is only necessary to open valve 32, which allows the oil from the jack to flow in opposite direction as before and back into the storage tank, through the manifold.

The weight of the car will at first force the oil out of the jack, until the car strikes the ground, then the spring 28 inside the jack will contract the jack and force the remaining oil back into the tank.

The jack is now ready to be lifted up into its backed position by the handwheel 60, as before described. It will be understood that all the wheels, or in other words, the whole car may be lifted clear off the ground at the same time with one operation of the pump.

The selecting devices are to be placed back of the instrument board, within the reach of the operator. The pump with the exception of the handle will be hidden behind the panel and only a small slot in the panel through which the pumphandle projects is visible. Only the face of the selecting device B will be visible and may be so designed and decorated, as to lend harmony with the other instruments already on the panel.

I claim:—

1. In a hydraulic jack the combination with a head suitable for fastening to an axle, of a series of telescopic cylinders carried by the head, trunnions to swingingly connect one of the cylinders to the head, a fluid inlet leading into one of the trunnions for expanding the cylinders to elevate the axle, and a shaft having manually controlled means connected to the other trunnion for swinging the cylinders into action.

2. In a hydraulic jack the combination with a head suitable for fastening to an axle, of a series of telescopic cylinders carried by the head, trunnions to swingingly connect one of the cylinders to the head, a fluid inlet leading into one of the trunnions for expanding the cylinders to elevate the axle, a gear fixed to the other trunnion, and a shaft having a gear to actuate the gear on the trunnion thereby swinging the cylinders into action.

3. In a hydraulic jack the combination with a head suitable for fastening to an axle, of a series of telescopic cylinders carried by the head, trunnions to swingingly connect one of the cylinders to the head, a fluid inlet leading into one of the trunnions for expanding the cylinders to elevate the axle, a gear fixed to the other trunnion, a flexible shaft having a gear to actuate the gear on the trunnion thereby swinging the cylinders into action, and a spring secured to the inner end of one of the trunnions and the base of the lower cylinder for contracting the cylinders when the lifting means is out of action.

4. In a hydraulic jack the combination with a head suitable for fastening to an axle, of a series of telescopic cylinders carried by the head, trunnions to swingingly connect one of the cylinders to the head, a fluid inlet leading into one of the trunnions for expanding the cylinders to elevate the axle, a shaft having manually controlled means connected to the other trunnion for swinging the cylinders into action, one of the cylinders having a base plate, spring hook members made to engage the plate when the cylinders are out of action, and a spring pressed follower sliding on the hook members to coact with the plate.

5. In a hydraulic jack the combination with a tank and a manifold, of a pump connecting the tank with the manifold, a plurality of telescopic jacks secured to the axles of a motor car, a series of flexible tubes leading from the manifold individually to each jack each having a valve, a selecting device having a flexible shaft connection with each jack normally out of action, and manually controlled means for actuating any one of the shafts so as to move a jack into operative position.

6. In a hydraulic jack the combination with a tank and a manifold, of a pump connecting the tank with the manifold, a plurality of telescopic jacks secured to the axles of a motor car, a series of flexible tubes leading from the manifold individually to each jack each having a valve, a pipe having a relief valve leading from the manifold to the tank opened when the fluid is forced from the jack, a selecting device having a flexible shaft connection with each jack normally out of action, and manually controlled means for actuating any one of the shafts so as to move a jack into operative position.

Signed at New York in the county of New York and State of New York this 11th day of September, A. D. 1928.

BARNEY GOLDMAN.